United States Patent Office 3,326,287
Patented June 20, 1967

3,326,287
PROCESS FOR OIL RECOVERY BY
AQUEOUS DRIVE
Myron L. Corrin, Tucson, Ariz., assignor to Phillips
Petroleum Company, a corporation of Delaware
No Drawing. Filed Apr. 26, 1965, Ser. No. 451,026
14 Claims. (Cl. 166—9)

This invention relates to an improved process for producing oil from an oil-bearing stratum by aqueous fluid drive utilizing surfactants.

The production of oil by aqueous fluid drive (water flooding or steam flooding) utilizing surfactants in the aqueous fluid is a proposed process for field operation. In such a process the amount of surfactant which must be used usually exceeds the concentration needed to be effective by several orders of magnitude. The reason lies in the fact, that the stratum, as a zeolite, attracts the surfactant from the aqueous carrier rather rapidly. This builds up the concentration of surfactant in the immediate vicinity of the injection well, leaving the carrier liquid substantially stripped and incapable of treating deeper parts of the stratum. The equilibrium which is established

[additive dissolved in carrier ⟵⟶ additive adsorbed by formation]

initially lies far to the right since the concentration of surfactant on the formation is substantially zero and since the liquid carrier (water) does not form any strong attractive bond with the surfactant. Yet the amount of surfactant needed to accomplish the purpose, such as wetting, is much smaller than that needed to establish the equilibrium.

This invention is concerned with a process for increasing the utility and effectiveness of non-ionic surfactants in aqueous fluid drive processes as applied to the recovery of oil from an oil-bearing stratum.

Accordingly, an object of the invention is to provide an improved aqueous fluid drive process for recovering oil from an oil-bearing stratum utilizing non-ionic surfactants. Another object is to improve the economics of water flooding operations in which non-ionic surfactants are incorporated in the injected water. A further object is to improve the utility and efficiency of surfactants in an aqueous fluid drive process utilizing the surfactants in solution therein. Other objects of the invention will become apparent to one skilled in the art upon consideration of the accompanying disclosure.

A broad aspect of the invention comprises injecting into an oil-bearing stratum thru a well therein an aqueous slug containing a non-ionic surfactant in solution therein in substantial and effective concentration and also containing suspended 0.001 to 1 micron size particles of the group consisting of carbon black, talc, and kaolin in a substantial and effective concentration and driving the aqueous slug into the stratum away from the injection well so as to displace oil from the stratum. The slug is either then driven on thru the stratum toward an offset production well or the pressure on the injection well is reduced so that the slug moves back to the injection well, moving the displaced oil into the injection well for production therefrom by conventional means such as pumping. When the process is applied to a single well, the injection, drive, and release of pressure steps are repeated until the procedure is no longer economical. The preferred method comprises driving the injected slug with a suitable driving fluid to one or more offset wells which may lie in a ring pattern around the injection well or in parallel lines of production wells on opposite sides of the injection well.

The driving fluid may be water, steam, or a suitable gas such as air or combustion gas.

The concentration of surfactant in the injected aqueous solution is in the range of 0.001 to 5 and, preferably, 0.01 to 1.0 weight percent of the slug. The particle size of the suspended solids is in the range of 0.001 to 1 micron and the concentration of the solids in the aqueous solution is in the range of 0.05 to 2 weight percent. The amount of slug injected lies in the range of 0.1 to 1.0 pore volumes although lesser and greater amounts of the suspended solids may be utilized, depending upon the pore size and pore character of the oil-bearing stratum being produced.

It has been surprisingly found that solid particles of the size specified of carbon black, talc, and kaolin (non-swelling) can be readily carried thru an oil-bearing stratum by aqueous drive in the manner described herein. It has also been found that the solids in suspension absorb the surfactant from the suspending solution and carry same into the stratum, giving up considerably less of the surfactant to the ambient rock or sand than is the case when the finely divided solids are omitted from the injected slug. In this manner, the amount of surfactant dissolved in the aqueous slug is considerably more effective than it would otherwise be by giving up the surfactant gradually as the solids move thru the pores of the stratum and distribute the surfactant over a greater area of sand or rock and to a greater depth in the stratum from the injection well.

A number of non-ionic surface active agents or surfactants which are water soluble are readily available from commercial sources. Hydrophylic (or lyophylic) agents attracted to the water phase are most desirably employed. Exemplary non-ionic agents are those obtained by reaction of a hydrophobic hydroxy compound such as a phenol or alcohol with several moles of an alkylene oxide principally ethylene oxide or propylene oxide. Water solubility increases with the number of moles of the alkylene oxide reacted. Such reaction products from oleyl alcohol, alkylated-B-naphthol, alkyl phenol such as nonylphenol, may be mentioned as exemplary. Similarly alkylene oxide (ethylene oxide) reaction products of higher fatty acids are well known as well as of fatty acid esters, including ethylene oxide reaction products of fatty acid esters of anhydrosorbitols. Lauric, palmitic, oleic, and stearic acids are commonly used for such esters which may generally be referred to as polyoxyalkylene derivatives of hexitol anhydride partial long chain fatty acid esters. The hexitol is usually sorbitol. Other non-ionic agents include phosphoric acid esters of polyethylene glycol; low order condensation products of alkylene oxides with esters of polyhydric alcohols and polybasic soluble acids, such as glycol tartrate and glycerol stearate further esterified with stearic acid; alkylene oxide condensation products of higher fatty acid reaction products with alkylolamines such as coconut fatty acids with diethanolamine; saponins; etc.

Not all non-ionic surfactants are equivalents in the process of the invention. It has been found that a number of non-ionic surfactants are considerably superior to others which have been carefully screened. These most effective compounds represent a common class of surfactants within special limitations as follows:

(1) They are all non-ionic polyethylene oxide ethers or thioethers.

(2) The average ethylene oxide chain length at the hydrophilic end is in the range of about 4 to 6.5 moles, with a single terminal hydroxyl group.

(3) The effectiveness of the surfactant in this particular application depends upon the length of the ethylene oxide chain as well as the overall length of the molecule.

(4) The hydrophobic (oleophilic) portion of the molecule may be either straight chain or branched hydrocarbons which may also be linked to the ethylene oxide portion through a phenolic ring, including the octyl and nonylphenols.

Certain polyethylene oxide ethers and thioethers listed below are commercially available and are especially effective in the process of the invention;

$C_{12}H_{25}(OCH_2-CH_2)_5OH$ (polyethylene oxide (4) lauryl ether)

$C_{16}H_{33}(OCH_2-CH_2)_2OH$ (polyethylene oxide (2) cetyl ether)

Tall oil—$(OCH_2-CH_2)_6$ (tall oil polyethylene oxide (6) ether)

$C_{12}H_{25}(OCH_2-CH_2)_{4.5ave}OH$ (polyethylene oxide (4.5) lauryl ether)

$C_xH_yS(CH_2-CH_2-O)_n-CH_2CH_2OH$ (polyethylene oxide thioether)

$$CH_3-CH_2-CH_2CH_2-\underset{\underset{CH_3}{|}}{CH}-CH_2-\underset{\underset{CH_3}{|}}{CH}-\underset{\underset{CH_3}{|}}{CH}-CH_2(OCH_2-CH_2)_nOH$$

(2,3.5-trimethylnonyl polyethylene oxide ether).

To demonstrate the effectiveness of the invention utilizing a solution or surfactant containing a suspension of solid particles of the required materials, two types of tests were made. The following solutions were made up as test solutions:

TABLE

| Surfactant: | Carrier |
|---|---|
| (1) Igepal CO530 | Philblack E |
| (2) Igepal CO530 | Philblack I |
| (3) Igepal CO530 | Kaolin |
| (4) Triton X-45 | Philblack E |
| (5) Ethomid 18/15 | Philblack E |
| (6) Gafac RM510 | Philblack E |
| (7) Igepal CO530 | Talc |

Further identification of the surfactants is:

Igepal CO530—nonylphenoxypolyethanol (6 to 6.5 ethoxy groups)

Triton X-45—alkyaryl polyether alcohol,

Ethomid 18/15—polyethyene hydrogenated tallow amide, and

Gafac RM510—free acid of a complex phosphate ester.

Each aqueous solution contained 0.06 weight percent of the surfactant and 0.1 weight percent of the solid carrier particles. Igepal was superior to the others in the amount of oil produced in the microcell test.

In order to test the ability of the solutions to produce oil from an oil sand, microcells were used. These microcells were each made from two 3″ x 1″ standard slides with a space of 15 mils between them. The spacing was established by a flat polyethylene bar 15 mils thick and 1/16″ wide. The slides were glued together at the edges with epoxy resin. The 15 mil space was filled with Burbank oil-wet sand and the fluids were injected at one end thru a hypodermic needle and were produced thru the outer end thru a hypodermic needle. In order to provide uniform flow over the cross section of the microcells, distribution bars 10 mils thick were positioned at both ends of the sand. The pore volume of the cells was approximately 0.5 cc.

Each of the solutions in the above table was injected into a microcell packed with Burbank sand and injection was continued till breakthru. In each test, at least 20 percent of the oil in the sand at the time of commencing the injection was produced thru the outlet hypodermic needle of the cell. This clearly demonstrates the effectiveness of the invention in displacing oil.

The other type test comprised injecting solution thru one end of a core of Burbank sand to determine the feasibility of moving the solid particles thru the actual core. In one test a core of Burbank said 1¼″ in diameter and 5″ long was utilized and it was found that the particles of carbon black, kaolin, and talc were readily moved thru the core with the solution from end to end thereof. In another test a simulated core formed by packing Burbank sand in a 1″ x 5′ long tube was utilized, injecting solution into one end of the tube and producing thru the other. In each situation, the carbon black, kaolin, and talc were produced in the effluent from the tube. These tests demonstrate the fact that fine particles of solid material are readily propagated thru a sand by aqueous fluid drive.

In applications wherein the oil-bearing stratum contains connate water in the form of brine, there is a tendency for the solid particles to precipitate out and plug the stratum. In such cases, a slug of fresh water, substantially free of salts, particularly NaCl, is injected prior to the injection of the aqueous slug containing surfactant and suspended particles. The amount of injected fresh water slug should be sufficient to provide a buffer zone between the injected surfactant slug and the connate water. An amount of at least 0.1 pore volumes and up to 3 pore volumes of fresh water will adequately protect the injected slug of surfactant and suspended solids from the connate salt water.

Another manner of operation comprises treating the particulate solid material to be used in the injection with sufficient surfactant for the process and then dispersing the treated particles in the aqueous medium to be used in the drive.

As the carbon black or other particles utilized in the process are carried into and thru the stratum by the displacing fluid, the absorbed surfactant slowly desorbs and becomes distributed on the rock or sand particles in the stratum. This adsorption effectively displaces oil by water wetting the reservoir rock or sand or by similar technique. At the same time, the injected particles become oleophilic, i.e., they adsorb oil which often tends to adhere tenaciously to rock or sand surfaces even under detergent water flood conditions. In this manner, the injected particles augment the sweep effect of the fluid displacement action.

It is also feasible to impregnate the finely divided solids to be injected with the selected surfactant, form a suspension of these particles in steam, and inject the gaseous suspension into the stratum thru the injection well whereby condensation of the steam forms an aqueous slug containing the surfactant-loaded particles and this aqueous slug is then advanced thru the stratum following the initial injection. The heat provided by the steam increases the effectiveness of the recovery process. Likewise, hot water may be utilized in the aqueous slug of surfactant and solids to improve the oil recovery.

Certain modifications of the invention will become apparent to those skilled in the art and the illustrative details disclosed are not to be construed as imposing unnecessary limitations on the invention.

I claim:

1. A process for producing oil from an oil-bearing stratum comprising the steps of:
   (1) injecting into said stratum thru a well therein an aqueous slug containing a non-ionic surfactant in solution therein in a concentration in the range of about 0.001 to 5 weight percent and suspended 0.001 to 1 micron size particles of the group consisting of carbon black, talc, and kaolin in a concentration in the range of about 0.05 to 2 weight percent;
   (2) driving the slug of step (1) into said stratum away from said well so as to displace oil from said stratum; and
   (3) producing the displaced oil from a well penetrating said stratum.

2. A process for producing oil from an oil-bearing stratum penetrated by an injection well and a production well which comprises the steps of:
   (1) injecting into said stratum thru said injection well an aqueous slug containing a non-ionic surfactant in solution therein in a concentration in the range of about 0.001 to 5 weight percent and suspended 0.001 to 1 micron size particles of the group consisting of carbon black, talc, and kaolin in a concentration in the range of about 0.05 to 2 weight percent;
   (2) driving the slug of step (1) thru said stratum toward said production well so as to displace oil and move same into said production well; and (3) producing the displaced oil of step (2) thru said production well.

3. The process of claim 1 wherein the amount of slug is in the range of 0.1 to 1.0 pore volumes.

4. The process of claim 2 wherein the amount of slug is in the range of 0.1 to 1.0 pore volumes.

5. The process of claim 2 wherein the slug in step (2) is driven with water.

6. The process of claim 2 wherein the slug in step (2) is driven with steam.

7. The process of claim 2 wherein the slug in step (2) is driven with air.

8. The process of claim 1 wherein the surfactant is a member of the group consisting of polyethylene oxide ethers and thioethers having a maximum ethylene oxide chain length at the hydrophilic end in the range of 4.5 to 6 moles, with a single terminal hydroxyl group.

9. The process of claim 2 wherein the surfactant is a member of the group consisting of polyethylene oxide ethers and thioethers having a maximum ethylene oxide chain length at the hydrophilic end in the range of 4.5 to 6 moles, with a single terminal hydroxyl group.

10. The process of claim 8 using carbon black particles.
11. The process of claim 8 using talc particles.
12. The process of claim 8 using kaolin particles.
13. The process of claim 1 wherein said stratum contains connate salt water and including the step of:
    (4) injecting into said stratum a slug of fresh water substantially free of salt prior to step (1).
14. The process of claim 2 wherein said stratum contains connate salt water and including the step of:
    (4) injecting into said stratum a slug of fresh water substantially free of salt prior to step (1).

References Cited

UNITED STATES PATENTS

| | | | |
|---|---|---|---|
| 2,800,962 | 7/1957 | Garst | 166—9 |
| 2,965,172 | 12/1960 | Da Roza | 166—42 |
| 3,051,234 | 8/1962 | Kyte | 166—9 |
| 3,170,514 | 2/1965 | Harvey | 166—9 |
| 3,180,414 | 4/1965 | Parker | 166—42 X |

CHARLES E. O'CONNELL, *Primary Examiner.*

JAMES A. LEPPINK, *Examiner.*